APPARATUS FOR TRANSLATING MAGNETICALLY RECORDED BINARY DATA

Filed Feb. 5, 1964 3 Sheets-Sheet 1

*INVENTORS*
CARTER E. DORRELL
GEORGE J. LAURER
*BY* John C Black
*ATTORNEY*

APPARATUS FOR TRANSLATING MAGNETICALLY RECORDED BINARY DATA

Filed Feb. 5, 1964 3 Sheets-Sheet 3

United States Patent Office 3,402,402

Patented Sept. 17, 1968

3,402,402
APPARATUS FOR TRANSLATING MAGNETICALLY RECORDED BINARY DATA

Carter E. Dorrell, Owego, and George J. Laurer, Endwell, N.Y., assignors to International Business Machines Corporation, New York, N.Y., a corporation of New York Filed Feb. 5, 1964, Ser. No. 344,523
9 Claims. (Cl. 340—174.1)

ABSTRACT OF THE DISCLOSURE

In a "peak detector" type of system for translating magnetically recorded binary data into digital form, a variable gain amplifier is interposed between a first Class A amplifier and the peak detector-integrator. The first amplifier is switched to an optimum one of three available gain levels under control of an automatic retry system. The variable gain amplifier responds to each output data signal from the first amplifier and diodes progressively reduce the amplifier gain as the data signal amplitude increases beyond predetermined levels. Bias means provide a lower threshold level for the variable gain amplifier and also inhibit its operation at heavy saturation levels.

This invention relates generally to improvements in circuits for translating magnetically recorded binary data into digital form. More particularly, the invention relates to an improved circuit for sensing information stored on a magnetic tape or the like and for transferring this information into a register.

Digital information is recorded on the magnetic surface of tape in the form of discrete magnetized areas or spots. In transferring this information to a register, the tape is fed past a transducer or magnetic head to generate signals in the pickup winding of the latter in accordance with the recorded data. Each magnetized spot represents a data bit and produces a corresponding signal varying from a reference level.

Two systems are frequently used for recording binary data on a magnetic tape. One type is known as a biased discrete pulse system wherein the background condition of the tape is a demagnetized condition and wherein the magnetic record is divided into unit lengths identified as bit cells. To record a data bit, a predetermined portion of a bit cell is magnetized with a predetermined polarity, usually to a condition of saturation. When reading data so recorded, there are two flux changes for each data bit which is read; and the two flux changes generate a signal with a 360° sine wave characteristic.

The second system of magnetized recording is known as NRZI (nonreturn to zero) type of system wherein a binary "0" is indicated by maintaining the magnetic condition of the bit cell constant at either one or two values throughout one bit period to the beginning of the next bit period. A binary "1" is indicated by shifting the magnetic condition between two values during one bit period. This system permits the storage of data at higher densities. An output pulse for a binary "1" is characterized by one half cycle of a sine wave.

The sine wave signals must be sensed by electrical circuits and stored in a register.

One particular effective type of sensing is disclosed in U.S. Patent 3,078,448, issued Feb. 19, 1963, to H. A. O'Brien. O'Brien discloses a method of "energy sensing" which has a high signal-to-noise ratio and which effectively senses signals which are too weak to be sensed in normal amplifier circuits without at the same time sensing high level noise.

O'Brien achieves this improved operation by applying the sensed signals in amplified form to an integrator. The output of the integrator is applied to a Schmitt trigger, the output of which is applied to the register. Low amplitude noise signals are rejected by the triggered threshold. High amplitude noise signals of short duration are rejected by the integrator in combination with the triggered threshold.

U.S. Patent 2,961,642, issued Nov. 22, 1960, to O. L. Lamb, discloses an improvement over O'Brien, which improves the signal-to-noise ratio and which obviates a timing problem inherent in O'Brien. Lamb interposes a differential amplifier between the signal amplifier and the integrator of O'Brien to synchronize the trailing edge of the integrator and Schmitt output with the peak of the input signal. The use of this instant in time for storing the sensed data in the register is of particular importance as set forth more fully in the Lamb patent. Briefly, this instant in time corresponds to the physical center of the magnetically stored data and does not vary. In other systems wherein another portion of the waveform is sensed, the leading edges of the resulting signals will occur at different times during the bit read cycle depending upon the amplitude of the waveform. High amplitude waveforms will be detected earlier in time than low amplitude forms. This frequently causes errors where the read times are short and particularly where the data recorded on the tape is skewed, i.e., at an angle other than normal to the direction of tape movement past the transducer read heads. When the data is skewed, the plurality to read heads which sense a multibit character produce the corresponding bit signals at different instants in time. The difference in time may be a substantial portion of a bit read cycle. If the sensed data bits are entered into the respective latches of the register at different instants in time, it is possible to enter the bit of one character into a register at a time when another character should be entered therein. Errors of this type are minimized when the signal peaks are sensed and used for timing the entry of data into register.

U.S. Patent 3,064,243, issued Nov. 13, 1962, to L. H. Thompson, discloses an improved peak detector amplifier which is particularly effective in the system disclosed by Lamb.

In systems combining the features of the above patents and in other known systems, serious problems are still encountered in certain applications. For example, old tapes, tapes which are dirty from improper handling and storage and tapes of poor quality produce relatively large noise signals and wide variations in the amplitude of the sensed data signals, e.g., 15 to 1 and higher. Another problem results when tape reading speeds vary substantially, e.g., as high as 50 per cent from tape to tape and even while reading the same tape. It is to these problems that the improved apparatus of the present application is particularly directed. It will be appreciated, however, that the invention is to be limited only by the scope of the appended claims.

One suggested solution to minimizing errors which are produced by these problems has been the use of a class A amplifier which has three selectable gain characteristics, an intermediate gain level and levels twenty percent higher and lower. The amplifier is normally operated with the intermediate gain characteristic to amplify the output of the transducer. In the event that an error is detected by the central processing unit to which the apparatus is coupled, the data will be reread with the amplifier gain set to the higher value. If the error occurs the second time, the amplifier gain is adjusted to the lowest level; and the information is read a third time. However, this method has not been particularly effective. Frequently the data from poor tapes cannot be detected.

In the past, as high as twenty percent of the tapes of this type were rejected; and the data was rewritten on other tapes. With the improved system of the present application, error rates have been reduced to five tapes in 7500, thus substantially eliminating the need for the expensive process of retrieving data for recording on new tapes.

It is therefore a primary object of the present invention to provide improved apparatus for translating magnetically recorded binary data which produces signals varying widely in amplitude.

It is another object of the present invention to provide improved apparatus for translating magnetically recorded data, which is particularly effective in rejecting noise signals.

It is another object of the present invention to provide improved apparatus for translating magnetically recorded data which is particularly effective in an environment of substantially varying tape reading speeds.

These objects are accomplished in the preferred embodiment of the present application by incorporating in apparatus generally similar to that of the Lamb patent, an amplifier which reduces the level of the amplified signals to one compatible with transistor circuits, which clips the signal swings of undesired polarity and which increases the amount of level reduction of the higher amplitude signals. The amplifier is further characterized by a transistor circuit which has initially high gain above a selected noise rejecting threshold following by succeeding sharply decreasing gain characteristic, as the input signal amplitude increases. The transistor operation approaches heavy saturation levels only above the maximum input signal level that is usually encountered. The transistor emitter circuit includes load resistors returned to a predetermined bias potential and a normally forward biased diode returned to a somewhat lower bias potential. The collector circuit includes a resistor load connected to a selected bias potential and a normally reverse biased diode returned to a selected lower bias potential.

The transistor is normally maintained nonconducting by the bias applied to the base. When the input signal exceeds the threshold level established by the base bias, the transistor begins to conduct. The gain of the amplifier at this time is substantially the gain of the transistor in a common emitter configuration by reason of the forward biased diode in the emitter circuit. When the input signal reaches a predetermined higher level the emitter diode becomes reverse biased whereby the gain of the transistor changes instantly to a lower value approximately equal to the effective collector load impedance divided by the effective emitter load impedance. When the input signal reaches a predetermined higher level, the collector diode forward biases; and the gain of the transistor is instantly reduced to a substantially lower value which is approximately equal to the impedance of a resistor connected in series with the collector diode divided by the effective impedance of the emitter load. As the input signal level increases further, the transistor approaches saturation at which point the gain of the transistor becomes very small.

The foregoing and other objects, features and advantages of the invention will be apparent from the following more particular description of a preferred embodiment of the invention, as illustrated in the accompanying drawings.

Figure 1:
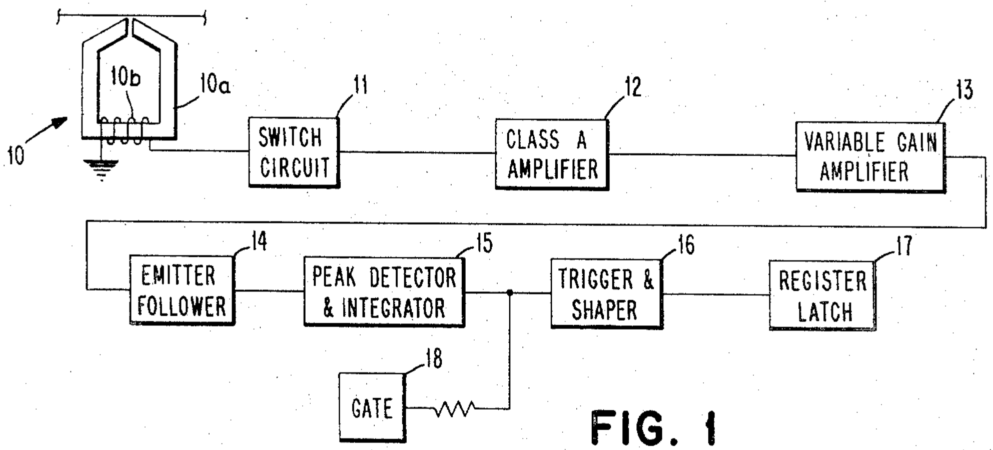
FIG. 1 illustrates the improved translating apparatus in block diagram form.

The improved translating apparatus set forth diagrammatically in FIG. 1 includes the transducer 10 of a magnetic tape reader including the usual core **10*a*** and coil

**10*b*. The output of each transducer is coupled by means of a conventional switch circuit 11 to a class A amplifier 12**.

In the preferred embodiment the amplifier 12 includes well known means (not shown) for selectively adjusting the gain of the amplifier 12 to a predetermined nominal value and to higher and lower values for rereading data which has produced error signals in the associated central processing unit (not shown) to which the apparatus is coupled. The output of the amplifier 12 is coupled to a special amplifier 13 which as described above has an initially high gain characteristic followed by successive substantially lower gain characteristics as the input signal amplitude increases.

The output of the amplifier 13 is coupled to a peak detector amplifier and clamped integrator circuit 15 by way of an emitter follower 14. The output of the circuit 15 is couped to a Schmitt trigger and pulse shaper 16, the output of which is coupled to a register latch 17 of conventional construction. A gate circuit 18 coupled to the circuit 15 renders the circuits 15, 16 and 17 ineffective in response to input signals when the gate is turned off. The gate is maintained in its off condition during the time interval that the switching circuit 11 is effective for connecting the transducer 10 to the amplifier 12, during which time interval excessive high level noise is encountered. This noise is so great that, without gate 18, the apparatus would be rendered ineffective for sensing data for several bit cycles.

Figure 2:
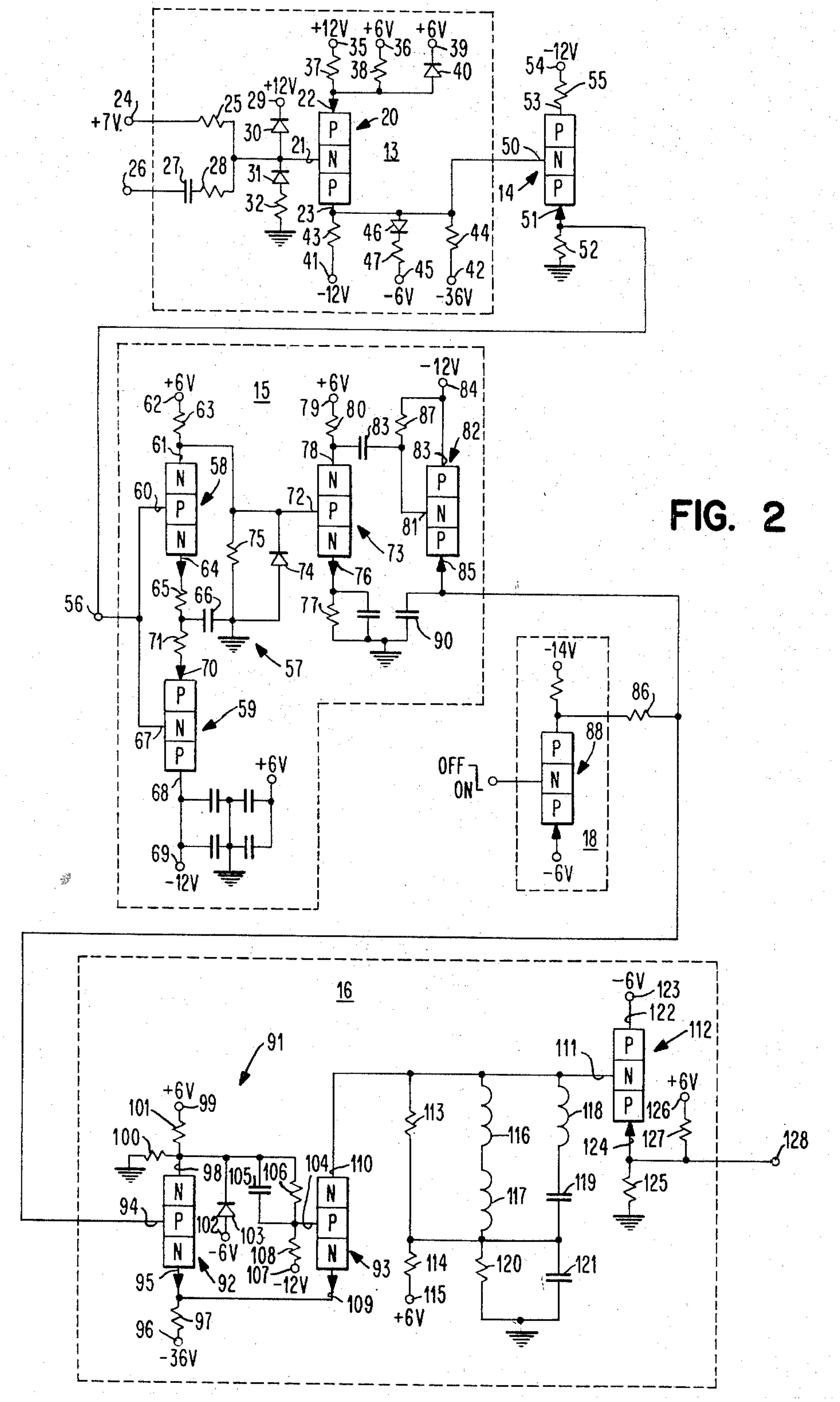
FIG. 2 is a schematic diagram of a preferred form of a portion of the improved apparatus.
Figure 6:
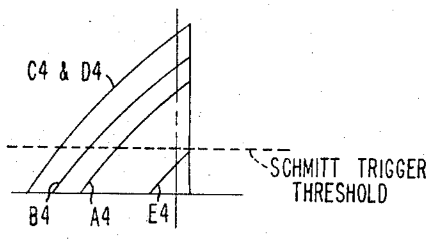

FIG. 2 is a schematic diagram of a preferred form of the circuits 13–16 and 18. The circuit 13 includes a transistor 20 having a base terminal 21, an emitter terminal 22 and a collector terminal 23. The base terminal 21 is connected to a source of bias potential by way of a resistor 25 and to a data input signal terminal 26 by way of coupling capacitor 27 and a resistor 28.

The resistors 25 and 28 form a voltage divider for converting input signals at the terminal 26 to a level compatible with transistor circuits. The base terminal 21 is connected to a potential terminal 29 by way of a diode 30 which prevents input signals of undesired polarity at the base from exceeding the potential at terminal 29. In this regard it is noted that the preferred embodiment is designed for use in biased discrete pulse systems. It will be appreciated, however, that the present apparatus may be used in NRZI systems by interposing the mixer 13 of the Lamb patent between the amplifier 12 and the circuit 13 of the present application.

The base terminal 21 is also connected to ground potential by way of a series connected diode 31 and a resistor 32. When the input signal amplitude of the polarity which is to be detected reaches a predetermined high value, the diode 31 becomes forward biased. With the diode 31 forward biased, the resistor 32 forms a part of the voltage divider including resistors 25 and 28 to cause succeeding incremental increases in the input signal to produce substantially lower incremental increases in the forward biasing potential at the base terminal 21.

The emitter terminal 22 is connected to bias potential terminals 35 and 36 by way of resistors 37 and 38, respectively. The emitter terminal 22 is also connected to a bias potential terminal 39 by way of a diode 40. The potential level at the terminal 39 is lower than the effective potential level produced by the parallel connected resistors 37 and 38 whereby the diode 40 is normally forward biased to set the potential of the emitter 22 at the level of terminal 39 plus the voltage drop across the diode 40.

The collector terminal 23 is connected to bias potential terminals 41 and 42 by way of resistors 43 and 44, respectively. The terminal 23 is also connected to a bias potential terminal 45 by way of a series connected diode 46 and resistor 47. The level of the potential at the terminal 45 is less than the effective bias potential of the parallel connected resistors 43 and 44 whereby the diode 46 is normally reverse biased.

The collector terminal 23 is also connected to the base terminal 50 of the emitter follower 14. The emitter follower 14 includes an emitter terminal 51 connected to ground potential by way of a resistor 52 and a collector terminal 53 connected to a bias potential terminal 54 by way of a low valued resistor 55.

The emitter terminal 51 is connected to the input terminal 56 of the circuit 15. The circuit 15 includes a peak detector amplifier 57 having complementary transistors 58 and 59.

The transistor 58 includes a base terminal 60 connected to the input terminal 56, a collector terminal 61 connected to a bias potential terminal 62 by way of load resistor 63 and an emitter terminal 64 connected to ground potential by way of a current limiting resistor 65 and a level setting capacitor 66.

The transistor 59 includes a base terminal 67 connected to the input terminal 56, a collector terminal 68 connected to a bias potential terminal 69 and an emitter terminal 70 connected to the capacitor 66 by way of a current limiting resistor 71.

The collector terminal 61 of the transistor 58 is connected to the base terminal 72 of a transistor 73. The collector terminal 61 is also connected to ground potential by way of a parallel connected resistor 75 and diode 74 which clamps any negative signals appearing at the collector 61 to ground potential. The collector load impedance 63 and the resistor 75 normally set the base bias potential for the transistor 73.

The transistor 73 includes an emitter terminal 76 connected to ground potential by way of a resistor 77 and a collector terminal 78 connected to a bias potential terminal 79 by way of a resistor 80. The collector terminal 78 is also connected to the base terminal 81 of a transistor 82 by way of a coupling capacitor 83. The transistor 82 includes a collector terminal 83 connected to a bias potential terminal 84 and an emitter terminal 85 connected to the output of the gate circuit 18 by way of a resistor 86. The base bias potential for the transistor 82 is provided by a resistor 87 connected to the base terminal 81 and to the bias terminal 84.

The gate 18 includes a transistor 88 connected in a common emitter configuration to apply its collector bias potential to the emitter terminal 85 when it is desired to render the translating apparatus ineffective and to apply its emitter bias potential to the emitter 85 when it's desired to render the apparatus effective. When the collector bias of the gate 18 is applied to the emitter terminal 85, the base emitter terminal of the emitter follower 82 becomes reverse biased.

The emitter 85 is also connected to ground potential by way of an integrating capacitor 90. The capacitor 90 integrates the output signals from the peak detector 57 and the integrated signals are applied to the Schmitt trigger and pulse shaper 16.

The circuit 16 includes a Schmitt trigger 91 having a pair of transistors 92 and 93. The transistor 92 includes a base terminal 94 which receives the above-said integrated signals. The transistor 92 also includes an emitter terminal 95 connected to a bias supply terminal 96 by way of a resistor 97 and a collector terminal 98 connected to ground potential and to a bias supply terminal 99 by way of resistors 100 and 101, respectively. The collector terminal 98 is also connected to a supply terminal 102 by way of clamping diode 103 and to the base terminal 104 of the transistor 93 by way of a parallel connected capacitor 105 and resistor 106. The base terminal 104 is also connected to a bias supply terminal 107 by way of a resistor 108.

The transistor 93 includes an emitter terminal 109 connected to the emitter terminal 95 and a collector terminal 110 which is connected to the base terminal 111 of an output transistor 112. The collector terminal 110 is also connected to an impedance network which includes a pair of resistors 113 and 114 which are connected in series between the collector terminal 110 and a bias supply terminal 115. A pair of inductors 116 and 117 are connected in series across the resistor 113. An inductor 118 and a capacitor 119 are connected in series across the resistor 113, and a resistor 120 and a capacitor 121 are connected in parallel between ground potential and the junction between the resistors 113 and 114.

The transistor 112 includes a collector terminal 122 connected to a bias supply terminal 123 and an emitter terminal 124 connected to ground potential by way of a resistor 125. The emitter terminal 124 is also connected to a bias supply terminal 126 by way of resistor 127 and to an output terminal 128.

In one specific application, the following component values have been utilized to achieve very satisfactory operation; however, it will be appreciated that these values are given by way of example and that the invention is to be limited only by the scope of the appended claims.

| | | |
|---|---|---|
| Resistor: | | |
| **25** | ohms | 3000 |
| **28** | do | 30000 |
| **32** | do | 3600 |
| **37** | do | 18000 |
| **38** | do | 3600 |
| **43** | do | 11000 |
| **44** | do | 91000 |
| **47** | do | 820 |
| **52** | do | 2700 |
| **55** | do | 20 |
| **63** | do | 16200 |
| **65** | do | 91 |
| **71** | do | 91 |
| **75** | do | 3010 |
| **77** | do | 750 |
| **80** | do | 10000 |
| **86** | do | 24000 |
| **87** | do | 13000 |
| **97** | do | 10000 |
| **100** | do | 5620 |
| **101** | do | 6810 |
| **106** | do | 8250 |
| **108** | do | 1210 |
| **113** | do | 2000 |
| **114** | do | 470 |
| **120** | do | 91 |
| **125** | do | 820 |
| **127** | do | 5600 |
| Capacitor: | | |
| **27** | μf | .047 |
| **66** | μf | .02 |
| **83** | μf | 1 |
| **90** | picofarads | 470 |
| **105** | do | 220 |
| **119** | do | 22 |
| **121** | μf | 4.7 |
| Inductor: | | |
| **116** | μh | 250 |
| **117** | μh | 250 |
| **118** | μh | 250 |

The operation of the apparatus will be described briefly, reference being directly to the graph and waveforms of FIGS. 3–6. When the transducer 10 produces a sine wave signal corresponding to a data bit, the signal is amplified by the class A amplifier 12 and applied to the input terminal 26 of the amplifier 13.

The transistor 20 is normally reverse biased and the positive half cycles of the data signals are rejected. Each negative half cycle having a maximum amplitude higher than a threshold level determined by the base-emitter bias circuits will turn the transistor 20 on.

Figure 3:
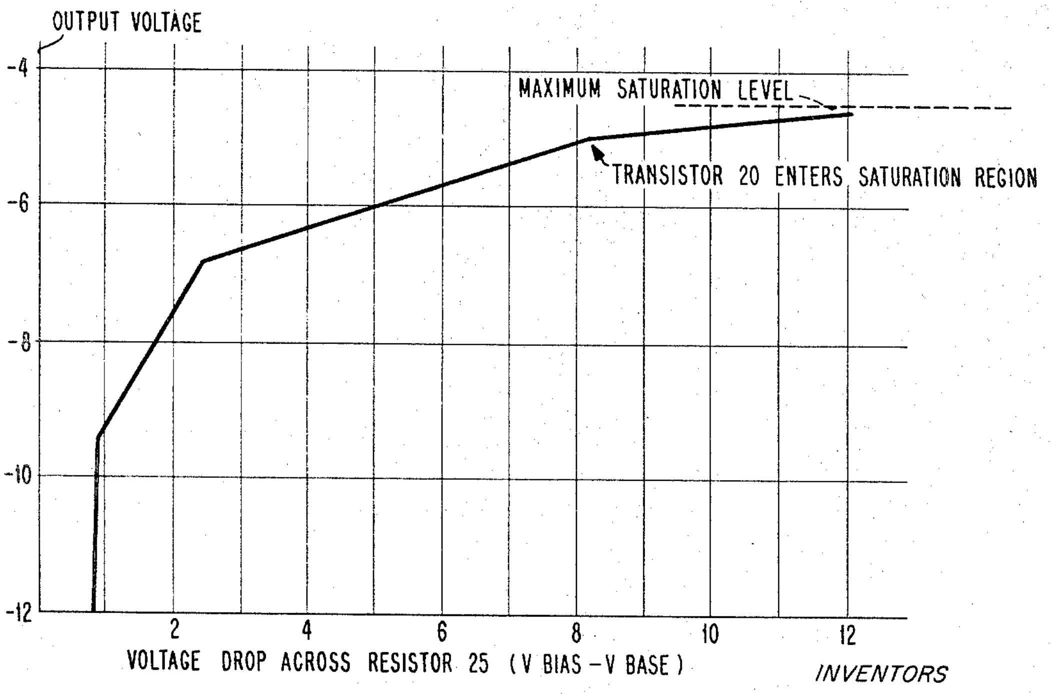
FIGS. 3 to 6 show a graph and waveforms illustrating the operating characteristics of the improved apparatus.

When the transistor 20 is turned on, the initial gain is very high as seen in FIG. 3. At this time, the diode 40 is forward biased, and the transistor acts as a grounded emitter amplifier. If the amplitude of the negative half cycle input is sufficiently high, the gain will be substantially reduced in three successive steps.

The first reduction occurs when the input amplitude reaches a level which reverse biases the diode 40. The gain of the transistor 20 approximates the effective collector load impedance divided by the effective emitter load impedance. With the diodes 40 and 46 reverse biased, the collector load impedance is the equivalent impedance of the parallel connected resistors 43 and 44. The effective emitter load impedance is the equivalent impedance of the parallel connected resistors 37 and 38.

The second reduction in gain occurs when the input amplitude reaches a level which causes the diode 46 to forward bias. The effective collector impedance is now reduced to the substantially lower equivalent impedance of the parallel connected resistors 43, 44 and 47. Within this region, the potential at the base terminal 21 begins to go negative with respect to ground; and the diode 31 forward biases to cause succeeding incremental increases in the input signal to produce substantially lower incremental increases in the base potential.

The last reduction in gain occurs when the input amplitude reaches a level which causes the transistor to enter the saturation region of its operating characteristic. The bias and operating potentials are selected so that the maximum input signals which can be anticipated do not drive the transistor to its maximum saturation level. This is of considerable importance since a square wave peak can cause the peak detector 57 to terminate its output pulse prior to the peak time of the data input signal to the amplifier 13.

Figure 4:
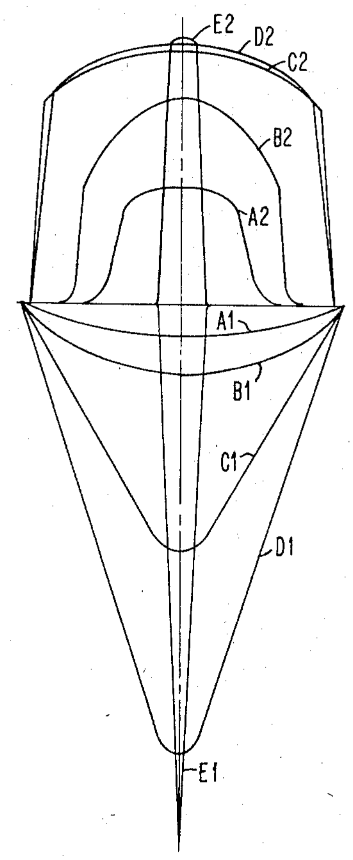

The effect upon the data signals produced by the variable gain characteristic is illustrated in FIG. 4. The negative half cycles of input signals having 15, 35, 140 and 220 volt peak-to-peak amplitudes are shown at A1, B1, C1 and D1. The corresponding output pulses produced by these signals are shown at A2, B2, C2 and D2, the maximum amplitudes being approximately 3, 5.5, 6.4 and 6.7 volts, respectively. A high amplitude noise signal of short time duration and its corresponding output signal are shown at E1 and E2. If the noise is of sufficiently high amplitude, it will drive the amplifier 13 into its maximum saturation level. This will cause the peak detector 57 to terminate its output pulse early, whereby both the amplifier 13 and the peak detector reduce the "energy content" of the noise signal to assure its rejection by the Schmitt trigger 91. If the noise signal does not fully saturate the amplifier 13, the latter alone sufficiently reduces the energy content to assure rejection of the noise signal.

The output of the amplifier 13 is applied to the peak detector 57 by way of the emitter follower 14. The operation of the peak detector is discussed in detail in the above-said Thompson patent.

Briefly, the emitter follower 14 normally applies a negative twelve volt signal to the input terminal 56, forward biasing the base-emitter junction of the transistor 59. The transistor 59 establishes a negative twelve volt potential across the capacitor 66. The transistor 58 is cut off, and its collector bias potential operates the transistor 73 in saturation. The emitter follower 82 is in conjunction establishing a negative twelve volt potential at its emitter terminal 85.

Figure 5:
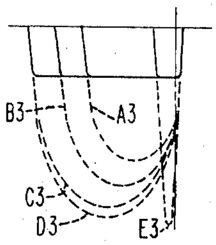

When a positive-going data signal is produced at the output of the amplifier 13, it is applied to the terminal 56 by way of the emitter follower 14. The transistor 59 is turned off and the transistor 58 begins to conduct producing a negative-going signal at its collector terminal 61. The latter signal is clamped slightly negative with respect to ground potential by the diode 74 and it turns off the transistor 73. In FIG. 5, the signals A3, B3, C3 and D3 and E3 illustrate the output signals at the collector terminal 61 produced by the amplifier output signals A2 to E2, respectively. The broken line portions of the signals have been clamped to ground potential by the diode 74.

Attention is directed to the trailing edges of the signals A3 to E3 which terminate a short time interval after the peak times of the signals A2 to E2. As described more fully in the above-said Thompson patent, this very short delay is due to the delay caused by the impedance of the charging circuit of the capacitor 66.

The collector bias potential of the transistor 73 applies a positive-going pulse to the emitter follower 82 to charge the integrating capacitor 90. The waveforms A4 to E4 show the voltage appearing across the capacitor 90 in response to the peak detector output signals A3 to E3, respectively.

The Schmitt trigger 91 is biased so that the transistor 93 is normally conducting and the transistor 92 is non-conducting. The transistor 93 establishes a negative potential level at the emitters 95 and 109 which is positive with respect to the negative twelve volt potential normally established at the base terminal 94 by the emitter follower 82. This potential difference is selected to provide the desired threshold potential which must be exceeded by the signals integrated by the capacitor 90 in order to produce an output pulse at the terminal 128.

The Schmitt trigger responds to the integrated pulses to produce pulses with steep leading and trailing edges when the turn-on threshold is exceeded and when the turn-off threshold is exceeded, respectively. The turn-off threshold is exceeded at the trailing edge of each integrated pulse, which edge corresponds in time with the peak time of the data signals produced by the transducer 10. The operation of the integrator and Schmitt trigger is explained more fully in the above-said Lamb patent.

The impedance network in the output circuit of the Schmitt trigger responds to the leading and trailing edges of the trigger pulses to produce steep positive and negative-going pulses of very short time duration relative to the trigger pulse. The positive-going pulse is rejected by the emitter follower 112 and the negative-going pulse is passed. This negative-going pulse corresponds in time with the peak time of the data pulse produced by the transducer 10 and sets the latch 17 to indicate the sensing of a "1" bit.

It will be appreciated that the circuits illustrated above are provided to sense data in one data channel of the tape. A similar circuit arrangement is provided for each channel of data.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In apparatus of the type in which first means are provided to produce first signals corresponding to data magnetically recorded on tape and in which circuit means including a peak detector responds to the first signals to produce pulses usable portions of which substantially correspond in time to the peak times of the first signals, in combination therewith, an amplifier interposed between said first means and said circuit means for producing high gain amplification of each said first signal at low signal levels exceeding a selected threshold and significantly lower gain amplification as the level of said first signal increases.

2. In apparatus of the type in which first means are provided to produce first signals corresponding to data magnetically recorded on tape and in which circuit means including a peak detector responds to the first signals to produce pulses usable portions of which substantially correspond in time to the peak times of the first signals, in combination therewith, an amplifier interposed between said first means and said circuit means for producing high gain amplification of each said first signal at low signal levels exceeding a selected threshold and significantly lower gain amplification as the level of said first signal increases, and bias means maintaining operation of the amplifier below heavy saturation levels when the first signals are at the highest anticipated level.

3. In apparatus of the type in which first means are provided to produce first signals corresponding to data magnetically recorded on tape and in which circuit means including a peak detector responds to the first signals to produce pulses usable portions of which substantially correspond in time to the peak times of the first signals, in combination therewith, a class A amplifier interposed between the first means and said circuit means and responsive to the first signals to produce second signals at its output, a second amplifier having its output coupled to the peak detector and having a selected input threshold level, means including a voltage divider coupling the class A amplifier output to the second amplifier, said second amplifier including means effective in response to each second signal for progressively reducing the gain of the second amplifier as the amplitude of each second signal exceeds predetermined levels, and bias means maintaining operation of the second amplifier below heavy saturation levels when the second signals are at the highest anticipated level.

4. In apparatus of the type in which a transducer produces first signals corresponding to data magnetically recorded on tape, in which a peak detector means produces second signals having trailing edges substantially corresponding in time to the peak times of the first signals, in which integrator means produce third signals with steep trailing edges substantially corresponding in time to the peak times of the first signals and in which means including a trigger circuit having an input threshold triggering level responds to the third signals having a predetermined energy content to produce signals at least one edge of which substantially corresponds in time to the peak times of the corresponding first signals, in combination therewith, an amplifier interposed between the transducer and the peak detector means for producing high gain amplification of each of said first signal at low signal levels exceeding a selected threshold and significantly lower gain amplification as the level of said first signal increases.

5. In apparatus of the type in which a transducer produces first signals corresponding to data magnetically recorded on tape, in which a peak detector means produces second signals having trailing edges substantially corresponding in time to the peak times of the first signals, in which integrator means produce third signals with steep trailing edges substantially corresponding in time to the peak times of the first signals and in which means including a trigger circuit having an input threshold triggering level responds to the third signals having a predetermined energy content to produce signals at least one edge of which substantially corresponds in time to the peak times of the corresponding first signals, in combination therewith, an amplifier interposed between the transducer and the peak detector means for producing high gain amplification of each said first signal at low signal levels exceeding a selected threshold and significantly lower gain amplification as the level of said first signal increases, and bias means maintaining operation of the amplifier below heavy saturation levels when the first signals are at the highest anticipated level.

6. In apparatus of the type in which a transducer produces first signals corresponding to data magnetically recorded on tape, in which a peak detector means produces second signals having trailing edges substantially corresponding in time to the peak times of the first signals, in which integrator means produce third signals with steep trailing edges substantially corresponding in time to the peak times of the first signals and in which means including a trigger circuit having an input threshold triggering level responds to the third signals having a predetermined energy content to produce signals at least one edge of which substantially corresponds in time to the peak times of the corresponding first signals, in combination therewith, a class A amplifier interposed between the transducer and the peak detector for amplifying the first signals, a second amplifier having its output coupled to the peak detector and having a selected input threshold level, means including a voltage divider coupling the amplified first signals to the second amplifier, said amplifier including means effective in response to predetermined levels of each input signal to the second amplifier for progressively reducing the gain of the second amplifier, and bias means maintaining operation of the second amplifier below heavy saturation levels when the first signals are at the highest anticipated level.

7. In apparatus of the type in which first means are provided to produce first signals corresponding to recorded data and in which circuit means including cascade connected differentiating, integrating and threshold triggering means respond to each first signal having at least a predetermined energy content to produce an output pulse a usable portion of which substantially corresponds to the peak time of the respective first signal, in combination with said first means and said circuit means, an amplifier interposed between said first means and said differentiating means producing high gain amplification of each said first signal at low signal levels exceeding a selected threshold and significantly lower gain amplification as the level of said first signal increases.

8. In apparatus of the type in which first means are provided to produce first signals corresponding to recorded data and in which circuit means including cascade connected differentiating, integrating and threshold triggering means respond to each first signal having at least a predetermined energy content to produce an output pulse a usable portion of which substantially corresponds to the peak time of the respective first signal, in combination with said first means and said circuit means, an amplifier interposed between said first means and said differentiating means producing high gain amplification of each said first signal at low signal levels exceeding a selected threshold and significantly lower gain amplification as the level of said first signal increases, and bias means maintaining operation of the amplifier below heavy saturation levels when the first signals are at the highest anticipated level.

9. In apparatus of the type in which first means are provided to produce first signals corresponding to recorded data and in which circuit means including cascade connected differentiating, integrating and threshold triggering means respond to each first signal having at least a predetermined energy content to produce an output pulse a usable portion of which substantially corresponds to the peak time of the respective first signal, in combination with said first means and said circuit means, a class A amplifier responsive to the first signals to produce second signals, a second amplifier having its output coupled to the circuit means and having a selected input threshold level, means including a voltage divider coupling the second signals to the second amplifier, said second amplifier including means effective in response to each second signal for progressively reducing the gain of the second amplifier as the amplitude of each second signal exceeding predetermined levels, and bias means maintaining operation of the second amplifier below heavy saturation levels when the second signals are at the highest anticipated level.

References Cited

UNITED STATES PATENTS

| | | | |
|---|---|---|---|
| 2,816,162 | 12/1957 | Johnson | 179—100.2 |
| 3,252,099 | 5/1966 | Dodd | 340—174.1 |
| 3,254,230 | 5/1966 | Wahrer | 307—88.5 |

BERNARD KONICK, *Primary Examiner.*

V. P. CANNEY, *Assistant Examiner.*